March 10, 1959 F. D. WEBSTER 2,877,423

AMPLIFIER DISTORTION CORRECTION SYSTEM

Filed July 19, 1954 2 Sheets-Sheet 1

INVENTOR
FULLERTON D. WEBSTER
BY Philip M. Bolton
ATTORNEY

March 10, 1959 F. D. WEBSTER 2,877,423

AMPLIFIER DISTORTION CORRECTION SYSTEM

Filed July 19, 1954 2 Sheets-Sheet 2

INVENTOR
FULLERTON D. WEBSTER
BY Philip M. Bolton
ATTORNEY

United States Patent Office 2,877,423

Patented Mar. 10, 1959

2,877,423

AMPLIFIER DISTORTION CORRECTION SYSTEM

Fullerton D. Webster, Mountain Lakes, N. J., assignor to Mackay Radio and Telegraph Company, New York, N. Y., a corporation of Delaware Application July 19, 1954, Serial No. 444,073

3 Claims. (Cl. 332—37)

This invention relates to a system adapted to amplify simultaneously a plurality of radio frequencies, and particularly to an arrangement for reducing spurious intermodulation products produced by the amplifiers in such systems.

It has become evident that in such transmission systems, a limiting factor to the amount of usable output power is the spurious intermodulation between two or more simultaneously amplified radio frequency energies.

This limitation is due to the generation of spurious side frequencies, which result from non-linear operation of the amplifiers. These side frequencies, if radiated, occupy spectrum space and may interfere with operation on adjacent channels.

Many types of feedback systems are known, the purpose of which is to correct or compensate for distortions arising from causes either intrinsic or extrinsic to the system; this invention relates to correction means for distortions arising from causes intrinsic to the system. The known forms of related correction systems are not desirable because they are either frequency sensitive, or are in the nature of volume control or gain control systems, or are not applicable to the systems for simultaneously amplifying a plurality of radio frequencies. This will be apparent from the following description of the invention.

It is an object of this invention to provide a distortion correction system which simply and accurately corrects the distortions produced by the amplifiers employed in such systems.

It is a further object of this invention to provide a correction system requiring a minimum of adjustment means to control the correction energy.

It is a further object of this invention to provide a distortion correction system which is not sensitive to the operating frequency of the system.

It is a feature of this invention to obtain an improvement in ratio of wanted signal amplitude to unwanted intermodulation product amplitude of at least 6 decibels.

It is a further feature of this invention to provide a feed back system which permits an increase in plate efficiency of the final amplifier, since it can be biased somewhat beyond the conditions for minimum distortion; the feedback automatically correcting for this condition.

In accordance with a broad aspect of this invention, there is provided a modulator system in which carrier waves are modulated by signal waves and amplified before transmission. The invention is characterized by providing means for deriving an envelope wave from the output of the system which contains the distortions produced in the amplifier, and feeding back this envelope to amplitude modulate the carrier or signal wave, preferably the signal wave, before it is applied to the modulator. The distortion envelope is fed back in such phase as to cancel the distortions produced by the amplifier or succeeding modulators.

It is significant to realize that the envelope waveform containing the distortion products does not appear anywhere in the system, and therefore the wave-form is fed back to modulate the signal or carrier source before application to the modulator for remodulation.

The above-mentioned and other features and objects of this invention and the manner of attaining them will become more apparent and the invention itself will be best understood, by reference to the following description of an embodiment of the invention taken in conjunction with the accompanying drawings, wherein Fig. 1 is an arrangement, shown partially in schematic diagram and partially in block diagram, of a system including the distortion correction arrangement of my invention.

Figure 2:
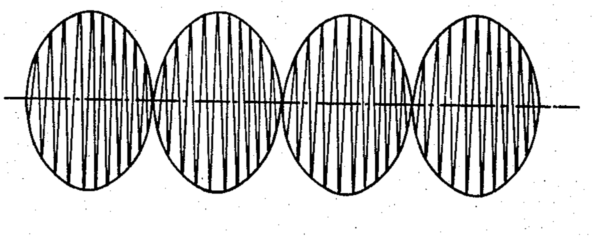
Fig. 2 is a wave-form produced by intermodulation between two frequencies of equal amplitude.

Referring first to Fig. 2, there is illustrated a wave-form produced by the intermodulation of two frequencies of equal amplitude. The two frequencies may, for example, have a difference frequency of 1000 cycles. The wave-form has the appearance of a modulated wave caused by amplitude modulating a steady carried to 100%, by means of a series of half sine waves, and mathematically is: $A\sqrt{1+\cos \omega T}$ where $\omega/2\pi$ is the difference frequency.

Figure 3:
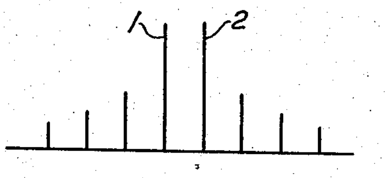
Fig. 3 is a spectrum of frequencies resulting from amplifier distortion.

The spectrum resulting from the distorted wave-form is seen in Fig. 3. The spectrum consists of two wanted frequencies 1, 2, and a series of unwanted side frequencies, separated from each other by the difference frequency; for example, 1000 cycles per second or integral multiples thereof.

Figure 1:
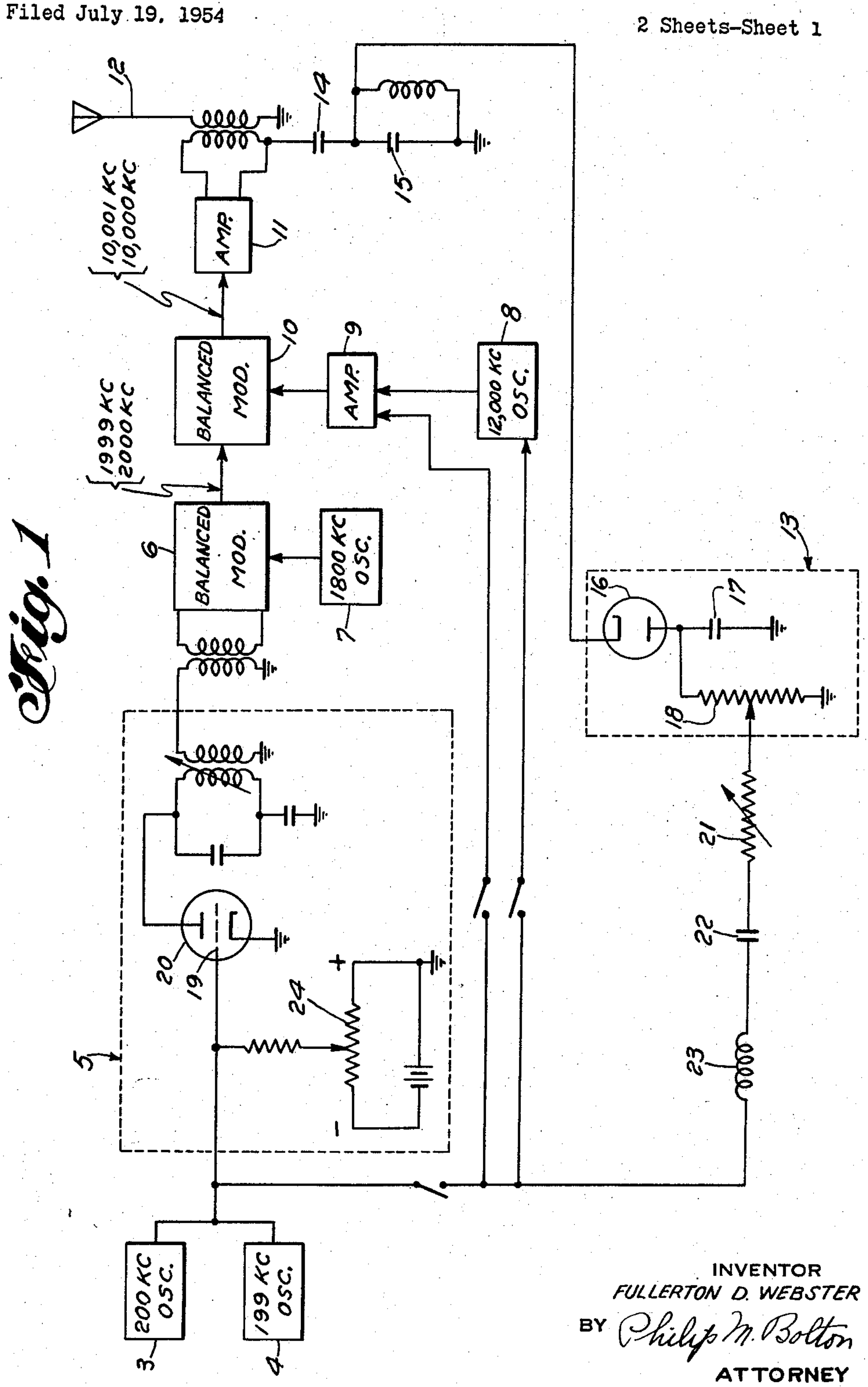

Referring now to Fig. 1 there is shown partially in schematic and partially in block diagram, a conventional Polyplex type transmission system, and the novel correction system forming the basis of this invention. The Polyplex transmission system comprises for example, a pair of oscillators 3 and 4, simultaneously generating energies of radio frequencies. By way of example oscillator 3 may generate 200 kilocycles per second, and oscillator 4 may generate 199 kilocycles per second. In the actual systems, each may be a frequency-shift carrier oscillator, but the type of signalling is not important to this invention. To transmit at a desirable high frequency level, the energies generated by oscillators 3 and 4 are amplified by modulator-amplifier 5 and mixed with suitable high frequency carrier waves in successive stages. In the first mixer stage, the two energies are applied to a balanced modulator 6, to which there is also applied a higher radio frequency intermediate carrier wave from an oscillator 7. The frequency produced by the oscillator 7, e. g. 1800 kilocycles per second and applied to the balanced modulator 6, is cancelled out by operation of the balanced modulator. However, from the output of the balanced modulator 6, there are selected only the upper side bands of the modulated intermediate carrier waves. Following our example, the upper side band frequencies are 2000 kilocycles per second and 1999 kilocycles per second as illustrated. These waves are applied to a final stage of mixing with a still higher radio frequency carrier wave. The source of final carrier waves comprises an oscillator 8, which operates, for example, at 12,000 kilocycles per second. The output from oscillator 8 is amplified in amplifier 9 and then applied to a second balanced modulator 10. In the balanced modulator 10, the final carrier waves are cancelled, and the lower side bands of 10,000 and 10,001 kilocycles per second, are selected. These two side band signals are amplified in amplifier 11 and then transmitted over antenna 12. If the amplifier 11 operates linearly, there will be no intermodulation distortion products between signals of the two frequencies amplified therein. However, if the amplifier operates non-linearly, distortion intermodulation products will occur between the two signals and a frequency spectrum such as illustrated in Fig. 3, will appear at the output thereof.

Figure 4:
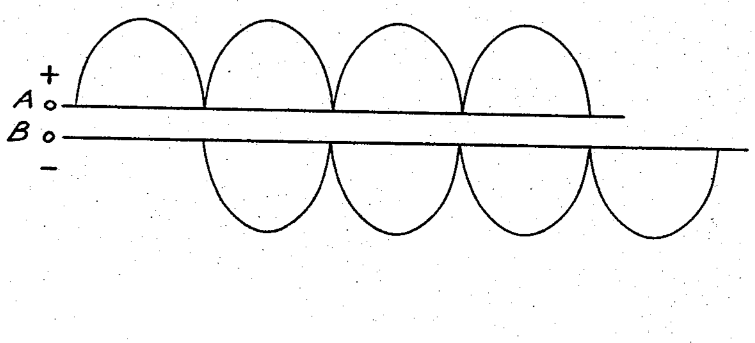
Fig. 4 is a voltage wave-form obtained after rectifying the wave-form shown in Fig. 2.

In accordance with the invention, the intermodulation wave-form is rectified by means of a diode or other non-linear demodulation device 13 producing a pulsating direct-current wave-form which is a precise duplicate of one-half the modulation envelope. The polarity of the envelope is determined by the diode connections and may be either positive or negative as shown in Fig. 4 (A and B). The rectified wave-form is then fed back to either amplifier 5, oscillator 8 or amplifier 9, to amplitude-modulate the energy there present, before application to the balanced modulator 6 or 10. Thus, the wave-form appearing at the output of modulator 6 or 10 has super-imposed thereon the distortion products; the distortion products having such phase as to cancel the distortion produced by succeeding stages.

Although the fed-back envelope may be applied either to amplifier 5, oscillator 7 or amplifier 8, or to all three stages simultaneously, it is preferably fed-back to the amplifier 5. Switches are shown to indicate the modifications possible.

The demodulator 13 is coupled through a voltage divider consisting of capacitors 14 and 15, to the output of amplifier 11, and comprises a diode rectifier 16, capacitor 17 and resistor 18. The rectified wave-form is developed across plate resistor 18, and is negative in form as shown by Fig. 4B. The wave-form is then coupled to the grid 19 of the modulator-amplifier tube 20 over a phasing circuit comprising variable resistor 21 and capacitor 22. A radio-frequency choke 23 is provided to block the radio-frequencies from passing to the demodulator stage 13. Thus, the fed-back wave is controlled in amplitude by variable resistor 18 and controlled in phase by the variable resistor 21. Variable resistor 24 is provided to control the operation of the amplifier tube 20, so that it conducts over a desirable range of its characteristic curve. It is to be realized that by slight modification, the fed-back wave-form may be applied to the cathode or anode circuit of the amplifier tube 20.

Thus, the fed-back energy amplitude modulates the signal wave from the oscillators 3, 4 and is properly phased to compensate for the distortion products introduced by the amplifiers.

While I have described above the principles of my invention in connection with specific apparatus, it is to be clearly understood that this description is made only by way of example and not as a limitation as set forth in the objects thereof and in the accompanying claims.

What is claimed is:

1. A modulation system comprising a first amplifier stage, a mixer stage comprising a modulator coupled to the output of said first amplifier stage, a second amplifier stage coupled to the output of said mixer stage, a plurality of sources of radio frequency signals of respectively different frequencies, means for applying said plurality of radio frequency signals simultaneously to said first amplifier stage, a source of carrier waves coupled to said modulator, rectifier means coupled to the output of said second amplifier stage for deriving from said last-mentioned amplifier stage an envelope wave containing spurious intermodulation products produced in said second amplifier stage, and a feedback circuit including a phase adjusting network coupled to the output of said rectifier means and connected to feed back said derived envelope wave to a stage of the system preceding said second amplifier stage in such phase as to reduce said spurious intermodulation products.

2. A system according to claim 1, in which said feedback circuit is coupled to the input circuit of said first amplifier stage.

3. A system according to claim 1, further comprising a third amplifier coupled between the output of said source of carrier waves and an input of said modulator, and in which said derived envelope wave is applied over said feedback circuit to said third amplifier.

References Cited in the file of this patent

UNITED STATES PATENTS

| | | |
|---|---|---|
| 2,186,958 | Collins | Jan. 16, 1940 |
| 2,298,930 | Decino | Oct. 13, 1942 |
| 2,429,649 | Romander | Oct. 28, 1947 |
| 2,491,107 | Hass | Dec. 13, 1949 |